United States Patent [19]

Farminer

[11] 4,082,690
[45] Apr. 4, 1978

[54] ANTIFOAM PROCESS FOR NON-AQUEOUS SYSTEMS

[75] Inventor: Kenneth W. Farminer, Midland, Mich.

[73] Assignee: Dow Corning Corporation, Midland, Mich.

[21] Appl. No.: 766,171

[22] Filed: Feb. 7, 1977

[51] Int. Cl.$^2$ ............................................ B01D 19/04
[52] U.S. Cl. .................................... 252/321; 252/358
[58] Field of Search ............................... 252/321, 358

[56] References Cited

U.S. PATENT DOCUMENTS

| 3,235,502 | 2/1966 | Waldmann | 252/321 X |
| 3,455,839 | 7/1969 | Rauner | 252/321 |
| 3,700,587 | 10/1972 | Hyde | 252/321 X |

*Primary Examiner*—Benjamin R. Padgett
*Assistant Examiner*—E. Suzanne Parr
*Attorney, Agent, or Firm*—Jack E. Moermond

[57] ABSTRACT

A method or process for reducing and/or preventing foam in non-aqueous systems such as crude oil and coking processes is disclosed. The method involves the use of a composition consisting essentially of (1) a polydimethylsiloxane fluid, (2) a particular siloxane resin, and (3) a hydrocarbon solvent.

8 Claims, No Drawings

ANTIFOAM PROCESS FOR NON-AQUEOUS SYSTEMS

Various kinds of foaming problems are encountered in non-aqueous systems. For example, severe foaming problems are often encountered in crude oils during separation of dissolved gases at the well-head. Certain crudes, notably deep offshore Gulf crudes, have been causing severe foaming problems which have been controlled by the use of excessive quantities of polydimethylsiloxane fluids per se. It is customary in such operations to dilute the polydimethylsiloxane fluid in an oil fraction such as diesel fuel and meter the diluted material into the foaming process stream. In certain crudes and at high flow rates, it is difficult to obtain a thorough dispersion of the silicone at the low active concentrations used (1–20 parts per million), even with the aforementioned dilution technique.

Also, in the processing of various residual petroleum stocks into coke, a commonly used technique is the well-known delayed coking process. In the delayed coking process heavy residual oils are heated to about 500° C. by pumping them at high velocity through a pipe furnace and then charging these oils to an insulated coking drum. Details of this process are set forth in various places in the literature. The delayed coking process produces quantities of foam which is undesirable since it diminishes the efficient operation of the process. As with the crude oils mentioned above, to control the foam in the delayed coking process it has been customary to treat the stocks being processed with polydimethylsiloxane fluids per se.

By way of further illustration the compositions of this invention can be used in various refinery processes such as crude units, vacuum units, vis breakers, delayed cokers and asphalt processing; well-head operations such as gas-oil separation; and as additives such as in hydraulic oils and lubricating oils.

It has been discovered in accordance with the present invention that where a composition consisting essentially of a polydimethylsiloxane fluid, a particular siloxane resin, and a hydrocarbon solvent is used in non-aqueous systems, foaming can be better reduced or prevented than by the use of a polydimethylsiloxane fluid per se.

More specifically, this invention relates to a method for reducing and/or preventing foam in a non-aqueous system which comprises adding to said system a composition consisting essentially of (1) about 30 to 45 percent by weight of a polydimethylsiloxane fluid, (2) about 1 to 5 percent by weight of a siloxane resin composed of $(CH_3)_3SiO_{\frac{1}{2}}$ units and $SiO_2$ units in which resin the ratio of $(CH_3)_3SiO_{\frac{1}{2}}$ units to $SiO_2$ units is in the range of 0.4:1 to 1.2:1, and (3) about 50 to 69 percent by weight of a hydrocarbon solvent for said fluid and resin.

The polydimethylsiloxane fluids useful in this invention are well known products whose preparation is described numerous places in the literature. While the amount of this ingredient can range from about 30 to 45 percent by weight of the composition, preferably it is present in an amount ranging between 35 and 40 percent. The viscosity of the polydimethylsiloxane fluid employed can range from 0.65 to 1,000,000 centistokes. However, for best results it is believed that the viscosity should be in the range of 1000 to 60,000 centistokes. The fluid used can be a viscosity obtained by taking a single cut during preparation or can be a blend of two or more cuts to obtain the desired viscosity.

The siloxane resin used in the composition of this invention is also a well-known material to those skilled in the silicone art and its preparation is well documented in the literature. The amount of the siloxane resin employed can broadly range from about 1 to 5 percent by weight of the composition, but preferably is present in an amount of from 2 to 4 percent. While the ratio of the $(CH_3)_3SiO_{\frac{1}{2}}$ units to $SiO_2$ units can be in the range of from 0.4:1 to 1.2:1, the most commonly available siloxane resins of this kind have a $(CH_3)_3SiO_{\frac{1}{2}}$ unit to $SiO_2$ unit ratio in the range of 0.6:1 to 1:1.

The third component of the composition used in this invention is a hydrocarbon solvent for the siloxane fluid and resin components. Numerous suitable hydrocarbon solvents are available for use herein, but xylene, toluene, mineral spirits, stoddard solvent, kerosene and naphtha are particularly preferred at this time. This solvent can constitute from 50 to 69 percent by weight of the composition, but preferably constitutes from 55 to 65 percent of the composition. Mixtures of such solvents can be used as well as individual solvents, the choice of solvent being primarily dictated by the non-aqueous system which presents the foaming problem.

In use, the compositions of this invention can be used as supplied or can be further diluted with additional solvent before incorporation into the non-aqueous foaming system. These compositions may be introduced into the non-aqueous foaming system at any suitable point of the processing using any of the well-known techniques. By way of further illustration, the compositions can be used to break or kill an existing head of foam, be introduced into a system prior to the time foaming normally occurs to prevent foaming, or it can be used to both reduce and prevent foaming simultaneously.

The amount of the composition of this invention used in reducing or preventing foam in non-aqueous systems will vary widely not only from system to system but depending on the severity of the problem within any given system at any given time. Generally speaking, the amount used will be such as to provide from 1 to 200 parts per million of the fluid and resin component.

Now in order that those skilled in the art may better understand how the present invention can be practiced, the following examples are given by way of illustration and not by way of limitation. All parts and percents referred to herein and by weight and all viscosities measured at 25° C. unless otherwise specified.

EXAMPLE 1

Two compositions were prepared. Composition A consisted essentially of (1) 93 percent of a polydimethylsiloxane fluid having a viscosity of about 12,500 cs., (2) 4.9 percent of a siloxane resin composed of $(CH_3)_3SiO_{\frac{1}{2}}$ units and $SiO_2$ units in which resin the ratio of the $(CH_3)_3SiO_{\frac{1}{2}}$ units to $SiO_2$ units was in the range of 0.6:1 to 1:1, and (3) 2.1 percent of xylene. Composition B was identical to the first except that it consisted essentially of (1) 95 percent of the siloxane fluid, (2) 3.5 percent of the siloxane resin, and (3) 1.5 percent of the xylene.

The above prepared compositions were tested for effectiveness as antifoams in non-aqueous systems using a hot pump test. This test makes use of a motor driven pump which continually recirculates the foaming system. The foaming system is pumped into a stainless steel cylinder 7 inches high with a 5 inch diameter (2000 ml. capacity) where foam height is measured. A heating mantel is at the base of the cylinder to control the temperature. The antifoam is subjected to high amounts of agitation, emulsification and shear in the test apparatus.

In this hot pump test 1000 ml. of a test crude oil (composite 331B obtained from Petroleum Laboratories) was placed in the cylinder. Then the crude oil was heated to 120°–125° F. The antifoam composition being tested was diluted to 10 percent solids (fluid plus resin) in xylene and then 0.5 g. of the diluted composition was added to the hot crude oil. This amount represents about 50 ppm. of the fluid-resin portion of the composition. Dispersibility of the composition (spreading on the surface or into the liquid) was noted (thin film versus particles). The pump was then started and recycled the crude oil and antifoam at the rate of 5000 ml. per minute. Data was recorded as foam height (inches) versus time (seconds). When the foam exceeded 3½ inches or at the end of 10 minutes, whichever occurred first, the pump was shut off. Data ("breaktime") was then recorded in seconds as to how quickly the foam collapsed to the first clear surface area. The longer the foam was controlled and the quicker it broke, the better the antifoam performance.

In the above test the crude oil per se, i.e. without any antifoam additive ran at a temperature between 132°–140° F. It took 2 seconds for the foam to reach 1 inch in height, 8 seconds for the foam to reach 2 inches, and 288 seconds for the foam to reach 3 inches. The breaktime was 37 seconds.

Composition A exhibited good dispersibility in this crude oil and ran in the above test at a temperature between 124°–134° F. Even after 10 minutes only one-half the surface had ¼ inch of foam on it. That is, a portion of the surface remained clear throughout the test and the foam height never approached the 1 inch level. The breaktime was 1 second.

Composition B also exhibited good dispersibility in this crude oil and ran in the above test at a temperature between 136°–140° F. Even after 10 minutes only one-half the surface had ½ inch of foam on it. That is, a portion of the surface remained clear throughout the test and the foam height never approached the 1 inch level. The breaktime was 1 second.

EXAMPLE 2

A composition was prepared which consisted essentially of 28 percent of a polydimethylsiloxane fluid having a viscosity of about 12,500 cs., 9 percent of a polydimethylsiloxane fluid having a viscosity of about 60,000 cs., 2.1 percent of the siloxane resin of Example 1, 0.9 percent of xylene, and 60 percent of kerosene. Experimental testing of this composition in a coking process resulted in successful control of the foam.

EXAMPLE 3

A composition was prepared as in Example 2 except that aliphatic petroleum naphtha was substituted for the keorsene. This substitution of solvent enhances the use of the composition at very low ($-60°$ F.) temperatures. Experimental testing of this composition to control foaming in Alaskan crude oil at low temperatures was successful.

That which is claimed is:

1. A method for reducing and/or preventing foam in a non-aqueous system which comprises adding to said system a composition consisting essentially of (1) about 30 to 45 percent by weight of a polydimethylsiloxane fluid, (2) about 1 to 5 percent by weight of a siloxane resin composed of $(CH_3)_3SiO_{\frac{1}{2}}$ units and $SiO_2$ units in which resin the ratio of $(CH_3)_3SiO_{\frac{1}{2}}$ units to $SiO_2$ units is in the range of 0.4:1 to 1.2:1, and (3) about 50 to 69 percent by weight of a hydrocarbon solvent for said fluid and resin.

2. A method as defined in claim 1 wherein the non-aqueous system is a hydrocarbon liquid, (1) is about 35 to 40 percent and has a viscosity in the range of 1000 to 60,000 centistokes, (2) is about 2 to 4 percent and the ratio of $(CH_3)_3SiO_{\frac{1}{2}}$ units to $SiO_2$ units is in the range of 0.6:1 to 1:1, and (3) is about 55 to 65 percent and is selected from the group consisting of xylene, toluene, mineral spirits, stoddard solvent, kerosene, and naphtha.

3. A method as defined in claim 2 wherein the non-aqueous system is crude oil and (3) is predominately kerosene.

4. A method as defined in claim 2 wherein the non-aqueous system is crude oil, and (3) is predominately naphtha.

5. A method as defined in claim 4 wherein the naphtha is an aliphatic petroleum naphtha.

6. A method as defined in claim 2 wherein the non-aqueous system is a residual petroleum stock in a coking process, and (3) is predominately kerosene.

7. A method as defined in claim 2 wherein the non-aqueous system is a residual petroleum stock in a coking process, and (3) is predominately naphtha.

8. A method as defined in claim 7 wherein the naphtha is an aliphatic petroleum naphtha.

* * * * *